United States Patent [19]

Honjo

[11] Patent Number: 5,787,225
[45] Date of Patent: Jul. 28, 1998

[54] OPTICAL DISK APPARATUS FOR THE REPRODUCTION OF COMPRESSED DATA

[75] Inventor: Masahiro Honjo, Sakai, Japan

[73] Assignee: Matsushita Electric Industrial Co., Ltd., Osaka, Japan

[21] Appl. No.: 219,615

[22] Filed: Mar. 29, 1994

[30] Foreign Application Priority Data

Mar. 29, 1993 [JP] Japan .................................. 5-069606

[51] Int. Cl.⁶ .................................................. H04N 5/783
[52] U.S. Cl. .......................... 386/105; 383/106; 383/111
[58] Field of Search ................................. 358/335, 341,
358/342, 343, 310; 348/390, 409; 360/33.1,
19.1, 35.1; 386/46, 67, 68, 95, 96, 104–106,
109, 111, 112, 124; H04N 5/76, 5/85

[56] References Cited

U.S. PATENT DOCUMENTS

| | | | |
|---|---|---|---|
| 5,140,437 | 8/1992 | Yonemitsu et al. | 358/342 |
| 5,305,113 | 4/1994 | Iwamura et al. | 358/335 |
| 5,371,602 | 12/1994 | Tsuboi et al. | 358/335 |
| 5,377,051 | 12/1994 | Lane et al. | 386/124 |

*Primary Examiner*—Thai Tran
*Assistant Examiner*—Huy Nguyen
*Attorney, Agent, or Firm*—Ratner & Prestia

[57] ABSTRACT

An optical disk apparatus includes: a signal processor for reading video data and audio data from an optical disk and for generating a video data signal and an audio data signal in accordance with the read-out video data and audio data; a video decoder for receiving the video data signal from the signal processor and for generating a reproduced video signal based on the received video data signal; and a controller for generating a high-speed reproduction control signal for switching from a normal reproduction to a high-speed reproduction, wherein the video decoder includes: video data decoder for decoding the video data signal; and a circuit for, when the high-speed reproduction control signal is received from the controller, outputting signals only corresponding to intra-coded video data and forward predictive coded video data among the decoded video data signals as the reproduced video signals, and for, otherwise, outputting the decoded video data signals as the reproduced video signals.

4 Claims, 6 Drawing Sheets

OPTICAL DISK APPARATUS FOR THE REPRODUCTION OF COMPRESSED DATA

BACKGROUND OF THE INVENTION

1. Field of the Invention

The present invention relates to an optical disk apparatus for reproducing compressed digital video data, and more particularly to an optical disk apparatus capable of performing a fast reproduction at speeds as high as two or three times normal speed. Hereinafter, the two times normal speed and the three times normal speed are referred to as 2-fold speed and 3-fold speed, respectively.

2. Description of the Related Art

Recently, in order to efficiently store video data in an optical disk such as a CD-ROM, there has been a proposition that video data to be stored should be compressed prior to the storage. Such data compression is performed by intra-coding within a field or a frame, and by forward predictive coding and bidirectional predictive coding between fields or between frames. The intra-coding uses information included in only one picture. If the intra-coded video data is decoded, a picture can be reconstructed only by the data. In the forward predictive coding and the bidirectional predictive coding, a difference from a picture which is located forward or backward along a time axis is coded. If only the data which was compressed by the forward predictive coding and the bidirectional predictive coding is decoded, a picture cannot be reconstructed, but the amount of video data to be coded can be greatly reduced.

In the conventional forward or backward high-speed reproduction (i.e., forward or backward cue), the optical disk was rotated at a speed substantially equal to the normal rotation speed, and only the intra-coded data was read out, so as to reproduce the picture. This is because the intra-coding data can reconstruct a picture.

However, the intra-coded video data is usually included in a ratio of one to ten over several frames. Accordingly, in the conventional high-speed reproduction in which only the intra-coded video data is reproduced, the resolution in time sequence is inevitably largely deteriorated.

In order to perform the reproduction at a speed as high as 2-fold speed or 3-fold speed by using only the intra-coded video data, the picture obtained from the intra-coded video data corresponding to one picture must be repeatedly reproduced several times until the next intra-coded video data is decoded and reproduced. This reveals that it is impossible to display smoothly continuous images at 2-fold speed or 3-fold speed by using only the intra-coded video data as in the prior art.

The time required for reading the intra-coded video data for one field or one frame from the optical disk and decoding the data is usually longer than the time required for outputting the decoded video data for one field or one frame to an image display portion and for reproducing the picture (1 frame=1/30 sec.). Accordingly, within the time in which the picture of the decoded video data is reproduced, the decoding of the data corresponding to the picture to be displayed next cannot be completed. For this reason, the picture which has already been reproduced must be repeatedly reproduced, until the decoding of data corresponding to the picture to be displayed next is completed. As described above, the conventional high-speed reproduction technique has a problem that it is impossible to sequentially perform one reproduction for one picture.

In the variable-speed reproduction as well as high-speed reproduction, the audio is muted for the following reason. If the audio data is decoded, the obtained audio cannot be reproduced with the picture.

SUMMARY OF THE INVENTION

The optical disk apparatus of this invention includes: signal processing means for reading video data and audio data from an optical disk and for generating a video data signal and an audio data signal in accordance with the read-out video data and audio data; video decoder means for receiving the video data signal from the signal processing means and for generating a reproduced video signal based on the received video data signal; and control means for generating a high-speed reproduction control signal for switching from a normal reproduction to a high-speed reproduction, wherein the video decoder means includes: video data decoding means for decoding the video data signal; and means for, when the high-speed reproduction control signal is received from the control means, outputting signals only corresponding to intra-coded video data and forward predictive coded video data among the decoded video data signals as the reproduced video signals, and for, otherwise, outputting the decoded video data signals as the reproduced video signals.

According to the invention, all of the video data recorded on the optical disk is read out at every reproduction speed. In a reproduction at the normal speed, the read-out video data is all decoded and output as the reproduced video signals. In the high-speed reproduction, among the read-out video data, only the intra-coded video data and the forward predictive coded video data are output as the reproduced video signals. Accordingly, it is possible to perform smooth image reproduction with enhanced resolution in time sequence as compared with the conventional high-speed reproduction which is performed by reading only the intra-coded video data from the optical disk, decoding the video data, and then outputting the decoded data.

According to the invention, in high-speed reproduction, the rotation speed of the motor is varied to be higher than the minimum speed required for realizing the transfer rate in the normal reproduction. Thus, even in the high-speed reproduction, all of the video data can be read out.

Furthermore, according to the invention, the audio data signal generated in the first period is demodulated, and the audio data signal output in the second period next to the first period is omitted without demodulation. The audio data signal generated in the first data is output as the reproduced audio signal until the next first period starts, so that the audio is reproduced in a substantially synchronous manner with the picture.

Thus, the invention described herein makes possible the advantage of providing an optical disk apparatus which can display smoothly continuous images in the reproduction at speeds slightly higher than the normal reproduction speed, such as two or three times normal speed, and which can reproduce audio with the picture.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples, with reference to the accompanying drawings.

First, the principle for a coding method for video data to be recorded onto an optical disk.

Figure 1:
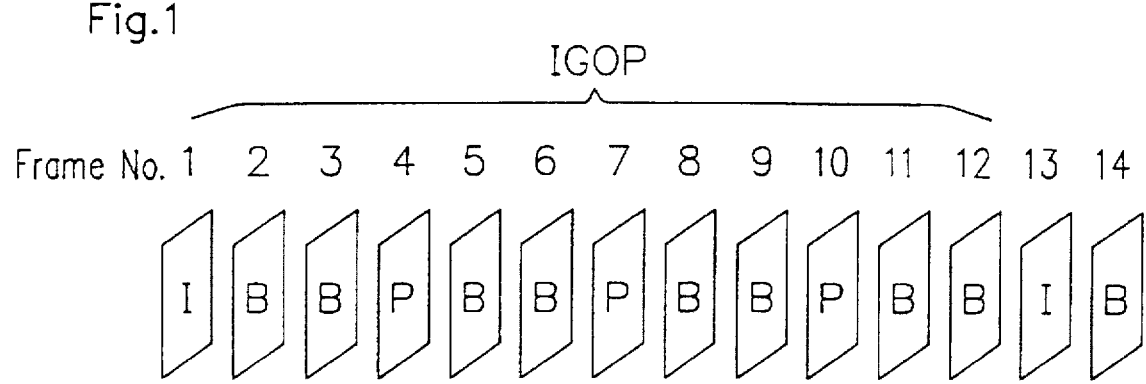
FIG. 1 is a view for describing the principle for a coding method of video data recorded on an optical disk.

FIG. 1 shows an example of a frame sequence according to an image coding method proposed by Moving Picture Experts Group (MPEG). One frame corresponds to one picture, and the frames are coded picture by picture. The frame sequence includes three kinds of pictures, namely, I-pictures, P-pictures, and B-pictures. An I-picture is a picture obtained by performing an intra-coding, which uses closed information within one image. The intra-coding usually has a poor compression efficiency. A P-picture is a picture obtained by performing a coding by using either a temporally preceding I-picture or P-picture as a reference picture from which to derive a difference. A B-picture is a picture obtained by performing a coding which uses a temporally preceding I-picture or P-picture, a temporally succeeding I-picture or P-picture, and an interpolated image generated from both the preceding and succeeding pictures.

In the exemplary frame sequence shown in FIG. 1, the 1st and 13th frames are I-pictures; the 4th, 7th, and 10th frames are P-pictures; the 2nd, 3rd, 5th, 6th, 8th, 9th, 11th, and 12th frames are B-pictures. The 1st frame to 12th frame constitute one GOP (Group Of Pictures).

Figure 2:
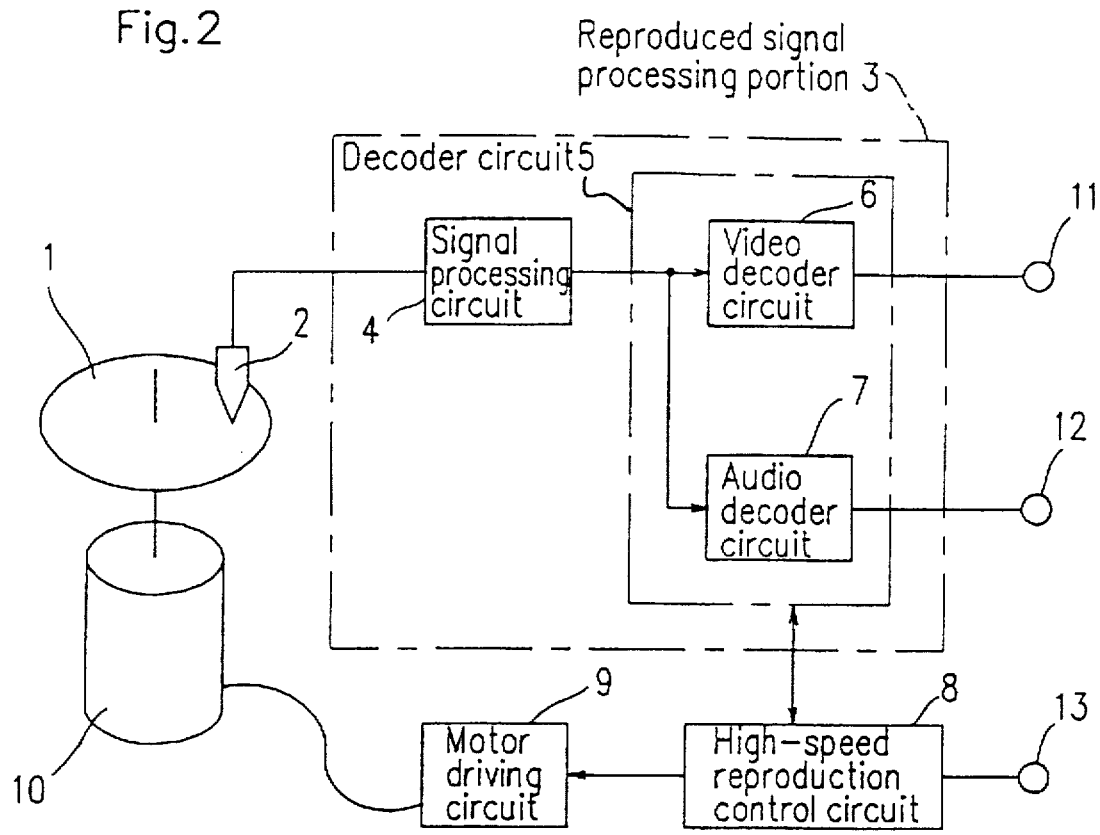
FIG. 2 is a diagram showing the construction of an optical disk apparatus according to the invention.

Next, referring to FIG. 2, an optical disk apparatus according to the invention will be described.

An optical disk 1 on which digital video data compressed by intra-coding, forward predictive coding and bidirectional predictive coding is recorded is rotated by a motor 10. The rotation speed of the optical disk 1 is controlled so that the circumferential velocity is kept constant. The motor 10 is driven by a motor driving circuit 9. The data recorded on the optical disk 1 is optically read out by a reproduction head 2, and then input into a reproduced signal processing portion 3 as an electrical signal. The reproduced signal processing portion 3 includes a signal processing circuit 4 and a decoder circuit 5. In the reproduced processing portion 3, the electrical signal input from the reproduction head 2 is subjected to digital demodulation, error correction, and the like. Then, the reproduced video signal is output to an output terminal 11 and the reproduced audio signal is output to an output terminal 12.

To the decoder circuit 5 and the motor driving circuit 9, a high-speed reproduction control circuit 8 is connected. To the high-speed reproduction control circuit 8, a terminal 13 is connected. When a signal instructing the high-speed reproduction is received at the terminal 13, the high-speed reproduction control circuit 8 controls the motor driving circuit 9 so that the rotation speed of the optical disk is increased to be higher than the rotation speed required for the normal reproduction. At the same time, the high-speed reproduction control circuit 8 controls a video decoder circuit 6 and an audio decoder circuit 7 in the decoder circuit 5 so as to perform predetermined operations.

Figure 3:
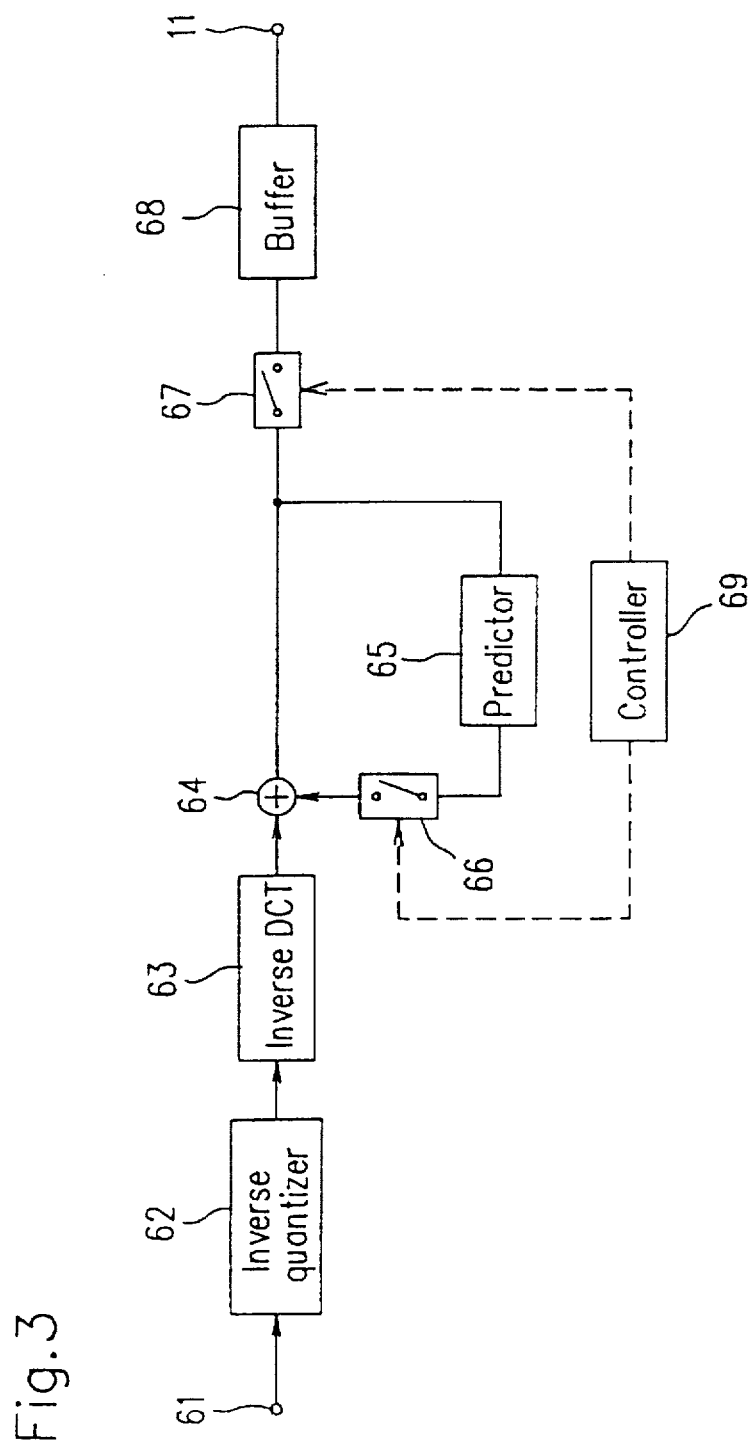
FIG. 3 is a diagram showing the construction of a video decoder circuit in the optical disk apparatus according to the invention.

FIG. 3 is a block diagram showing a construction of the video decoder circuit 6. The video data signal output from the signal processing circuit 4 is input from a terminal 61 into an inverse quantizer 62 and then an inverse discrete cosine transform circuit (hereinafter referred to merely as an inverse DCT circuit) 63. The video data signal which has been processed by the inverse quantization and the inverse discrete cosine transform is input into an adder 64. The output signal from the adder 64 is input into a predictor 65. The video signal output from the predictor 65 is input into the adder 64 again via a switch 66. The switch 66 is opened only when the video signal output from the predictor 65 corresponds to the I-picture. Otherwise, the switch 66 is always closed. The open/close of the switch 66 is controlled by a controller 69.

The video signal which is thus output from the adder 64 is input into a switch 67. During normal reproduction, the switch 67 is always closed, so that the video signal input into the switch 67 is all fed to an output buffer 68. The output from the output buffer 68 is connected to the terminal 11. From the terminal 11, the reproduced video signals corresponding to I-picture, P-picture, and B-picture are output frame by frame. During high-speed reproduction, the switch 67 is closed when the input video signal corresponds to I-picture or P-picture, and is opened when the input video signal corresponds to B-picture. Accordingly, during the high-speed reproduction, only the video signals corresponding to I-picture and P-picture are input into the output buffer 68. In this example, the open/close of the switch 67 as well as the switch 66 is controlled by the controller 69.

Figure 4:
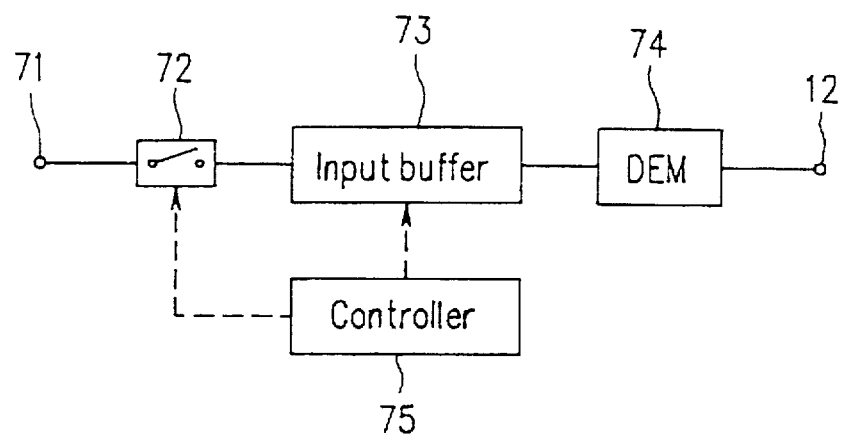
FIG. 4 is a diagram showing the construction of an audio decoder circuit in the optical disk apparatus according to the invention.

FIG. 4 shows a first exemplary construction of the audio decoder circuit 7. The audio data signal output from the signal processing circuit 4 is input into a switch 72 from a terminal 71. The switch 72 is closed and made conductive for a prescribed period after a control signal is received from a controller 75. When the switch 72 is closed, the audio data signal is input into a buffer 73. The buffer 73 outputs the input audio data signal to a DEM 74. When a detection circuit (not shown) detects that the data amount of the audio data signal stored in the buffer 73 lowers below a prescribed amount, a controller 75 generates the control signal for controlling the switch 72, based on the detected result by the detection circuit. Accordingly, the buffer 73 receives the audio data signal which is input into the switch 72 when the switch 72 is closed. The audio data signal input into the DEM 74 is output to the terminal 12 after digital demodulation.

Figure 5:
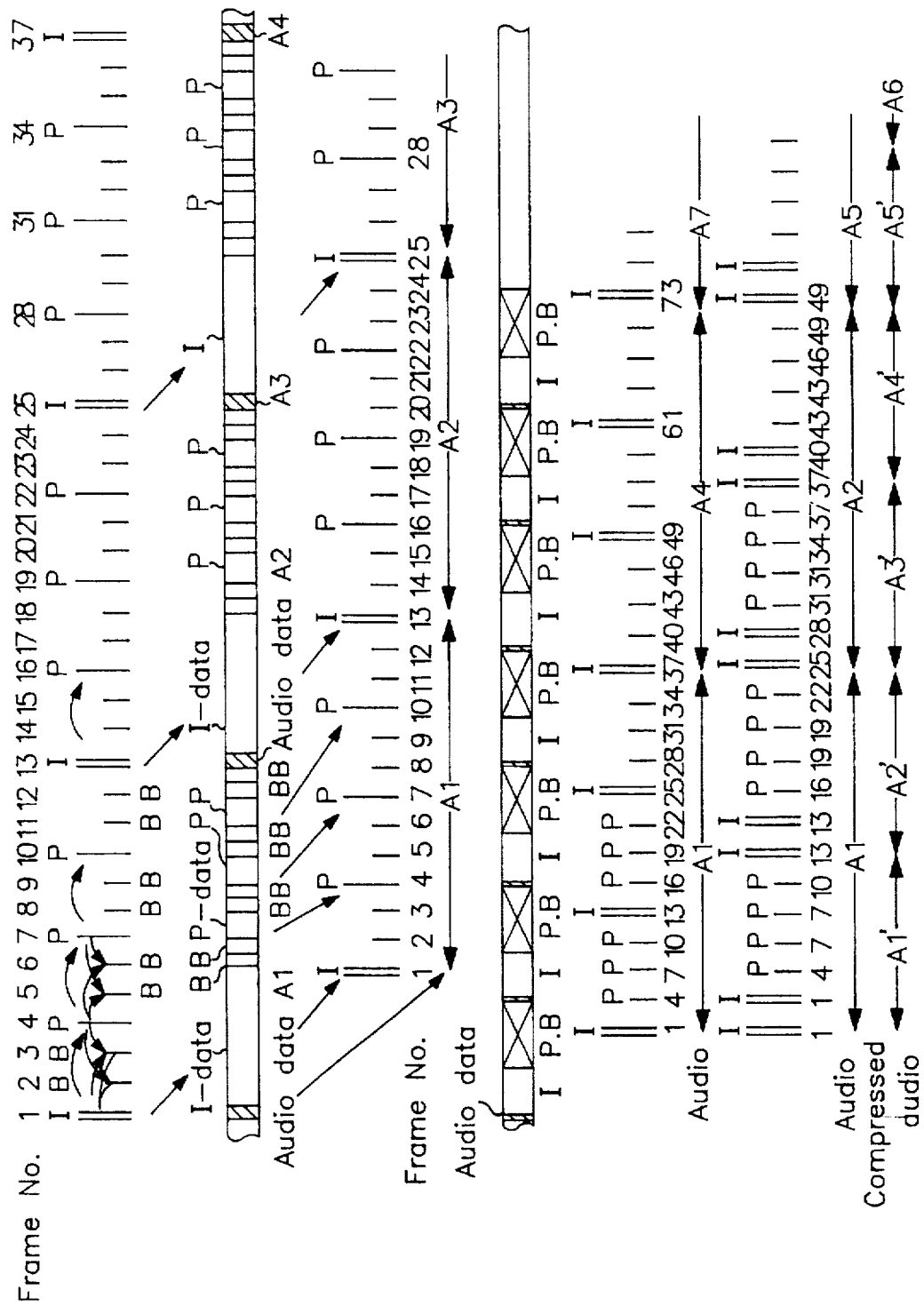
FIGS. 5(A) to 5(G) schematically show patterns of reproduced signals in one example of the invention.

Hereinafter, with reference to FIGS. 3, 4, and 5, the operations of the optical disk apparatus during the normal reproduction and the high-speed reproduction will be described.

FIG. 5(A) indicates a coding pattern of signals recorded on the optical disk 1. As described above with reference to FIG. 1, the video data in the 1st, 13th, 25th and 37th frames is compressed by intra-coding. The video data in the 4th, 7th, 10th, 16th frames, etc. is compressed by forward predictive coding. The video data in the 2nd, 3rd, 5th, 6th frames, etc., is compressed by bidirectional predictive coding. The thus compressed data is recorded on the optical disk 1. In the normal reproduction, the motor driving circuit 9 controls the motor 10 so as to rotate the optical disk 1 at a predetermined speed. From the rotating optical disk 1, information including audio data and video data is optically read out by the reproduction head 2, and output as an electrical signal. FIG. 5(B) indicates a data sequence read out by the reproduction head 2 during the normal reproduction. The horizontal axis represents time. The output time period for one frame is 1/30 sec. regardless of the coding methods, but the data amount per frame is different depending on the coding methods. The data amount of the intra-coded frame is the largest, and the data amount of the bidirectional predictive coded frame is the smallest. Therefore, as is seen from FIG. 5(B), the time required for reading the video data in the intra-coded frame is longer than the time required for reading the video data in the forward predictive coded frame or bidirectional predictive coded frame. Just before the video data in the intra-coded frame, the audio data corresponding to the GOP to which the intra-coded frame belongs is recorded.

The signal output from the reproduction head 2 is input into the video decoder circuit 6 and the audio decoder circuit 7 via the signal processing circuit 4. The video decoder circuit 6 decodes the video data in the above-described manner, and outputs the decoded video data to the terminal 11 frame by frame in the order recorded on the optical disk 1. The pattern of the reproduced and decoded video signals output to the terminal 11 from the video decoder circuit 6 is shown in FIG. 5(C). In the optical disk apparatus of this example, the time required for reading the data for one GOP from the optical disk 1 in the normal reproduction is set to be equal to the time for outputting the reproduced video signals for one GOP to the terminal 11. Alternatively, the time required for reading the data for one GOP is slightly shorter than the time for outputting the reproduced video signals for one GOP. The reproduced video signals are supplied to an image display portion (not shown) from the terminal 11. When the reproduced video signals are received via the terminal 11, the image display portion sequentially displays a picture of one frame for 1/30 sec.

The audio data is recorded just before the video data in the GOP corresponding to the audio data as is shown in FIG. 5(B). The audio data read out by the reproduction head 2 is subjected to predetermined processes by the signal processing circuit 4, and then input into the audio decoder circuit 7. In the audio decoder circuit 7, the input audio data signals are decoded in the above-described manner so as to be output to the terminal 12.

In more detail, after audio data A1 corresponding to the first GOP is input into the buffer 73, the switch 72 is opened. The audio data signal A1 stored in the buffer 73 is output to the DEM 74. When the residual amount of the audio data signal A1 stored in the buffer 73 becomes small, the controller 75 generates a control signal so as to close the switch 72. An audio data signal which is first input from the terminal 71 after the switch 72 is closed is input into the buffer 73 as the next audio data signal succeeding to the audio data signal A1. The output rate of the audio data signals from the buffer 73 to the DEM 74 is set such that the first audio data signal after the switch 72 is closed is the audio data signal A2 in the normal reproduction. Thus, in normal reproduction, a reproduced audio signal for a GOP is output from the terminal 12 in a synchronous manner with a reproduced video signal of the GOP.

Next, the operation of the optical disk apparatus during the reproduction at 3-fold speed will be described. The optical disk apparatus only uses I-picture and P-picture for reproducing images at 3-fold speed. However, it is difficult to selectively read out only the I-picture and P-picture when the video data is to be read out from the optical disk 1. This is because B-picture and P-picture are recorded in a mixed order as is shown in FIG. 5(B). If it is possible to selectively read out only the I-picture and P-picture, this may complicate the construction of the apparatus. Therefore, in the optical disk apparatus of the invention, all data is read out from the optical disk 1, and the video data corresponding to B-picture is removed from the read-out video data. In order to realize such a method, the transfer rate during the high-speed reproduction is set higher than the transfer rate during the normal reproduction.

First, signals for high-speed reproduction are input through a terminal 13 from a central processing unit (CPU) or the like (not shown). For example, such signals for high-speed reproduction include a signal indicating the reproduction speed such as 3-fold speed or 2-fold speed, and the like. The high-speed reproduction control circuit 8 increases the rotation speed of the optical disk 1 by controlling the motor driving circuit 9 based on the received signals for high-speed reproduction. If it is assumed that the image is reproduced at n-fold speed, the rotation speed of the optical disk in the reproduction at n-fold speed is set to be n times the minimum rotation speed required for realizing the transfer rate in the normal reproduction. For example, the transfer rate in the normal reproduction is 3.0 Mbps, and the rotation speed of the optical disk 1 in the normal reproduction is set to be the minimum rotation speed required for realizing the transfer rate. Therefore, when the image is to be reproduced at 3-fold speed, the rotation speed of the optical disk 1 is set to be 3 times so that the transfer rate becomes 9.0 Mbps. If the rotation speed is increased to be 3 times, the time required for reading the data for one GOP from the optical disk 1 becomes 1/3, as is shown in FIG. 5(D). In this way, the transfer rate is increased to be 3 times the transfer rate in the normal reproduction, so that all the video data is read out.

When the signals for high-speed reproduction are received, the high-speed reproduction control circuit 8 outputs the signals for high-speed reproduction to the video decoder circuit 6. The controller 69 of the video decoder circuit 6 receives the signals from the high-speed reproduction control circuit 8. Hereinafter, the operation of the video decoder circuit 6 is described. The video data signal output from the signal processing circuit 4 is input through the terminal 61 of the video decoder circuit 6. In the video decoder circuit 6, the video data signal is processed by inverse quantization and the inverse discrete cosine transform, and then output from the adder 64 as a video signal to the switch 67. As described above, the switch 67 is controlled by the controller 69 in such a manner that it is closed when the video signal corresponds to I-picture or P-picture, and opened when the video signal corresponds to B-picture. Accordingly, to the output buffer 68, only the video signals corresponding to I-picture and P-picture are input. The video signals input to the output buffer 68 are output once for each frame. Thus, at the terminal 11, signals which display each picture once are output as the reproduced video signals.

In FIG. 5(E), a pattern of the reproduced video signals output from the video decoder circuit 6 to the terminal 11. As described above, the video decoder circuit 6 outputs only the reproduced video signals corresponding to I-picture and P-picture for 1/30 sec. per frame the same as in the reproduction at normal speed, after removing the video data corresponding to B-picture. Unlike the conventional optical disk apparatus which outputs only the reproduced video signals corresponding to I-picture, the optical disk apparatus of the invention can realize the image reproduction at 3-fold speed by outputting an image of a single frame once only. Also, P-picture as well as I-picture is used, so that the resolution in time sequence can be enhanced as compared with the conventional optical disk apparatus, and more smoothly continuous images can be reproduced.

The operation of the audio decoder circuit 7 in the image reproduction at 3-fold speed is substantially the same as in the image reproduction at the normal speed. First, audio data corresponding to the first GOP is input into the buffer 73. The input audio data signal A1 is output from the buffer 73 to the DEM 74. As described above, the output rate of the buffer 73 is set such that the signal which is input into the buffer 73 next to the audio data signal A1 is the audio data signal A2 in the normal reproduction. When the residual amount of the audio data signal A1 stored in the buffer 73 becomes small, a detection circuit (not shown) detects this, and outputs a detection signal to the controller 75. When the detection signal is received, the controller 75 generates a control signal so as to close the switch 72. Next, an audio data signal which is first input from the terminal 71 after the switch 72 is closed is input into the buffer 73. As shown in FIG. 5(D), when images are reproduced at 3-fold speed, the data for one GOP is read out for a time period which is ⅓ of the normal reproduction. Thus, while the buffer 73 outputs the audio data signal A1 to the DEM 74, the audio data signals A2 and A3 are read out from the optical disk 1, and input to the switch 72 through the terminal 71. Accordingly, to the buffer 73, the audio data signal A4 is input succeedingly to the audio data signal A1. In the same way, succeedingly to the audio data signal A4, the audio data signal A7 is input to the buffer 73, while the signals A5 and A6 are skipped.

The audio data signals input to the buffer 73 are output from the DEM 74 to the terminal 12. At this time, each of the audio data signals is output for a time period which is equal to the time required for outputting the images for one GOP to the terminal 12, as in the normal reproduction. FIG. 5(E) shows a pattern for the reproduced audio signals output to the terminal 12 with a pattern of reproduced video signals output to the terminal 11 in the case where images are reproduced at 3-fold speed. As is seen from FIG. 5(E), the optical disk apparatus of the invention can output the reproduced audio signals to the terminal 12 discretely, but at the same rate as in the normal image reproduction and in a synchronous manner with the reproduced video signals in terms of a unit of three GOPs.

As described above, by the optical disk apparatus of the invention, the images can be smoothly reproduced at 3-fold speed with audio. The audio is discretely reproduced such as A1, A4, and A7. However, at such a discrete degree, the contents of the audio can be sufficiently understood.

Next, the operation of the optical disk apparatus in the reproduction at 2-fold speed is described. In this case, as in the image reproduction at 3-fold speed, the motor driving circuit 9 is controlled by the high-speed reproduction control circuit 8 such that the rotation speed of the optical disk 1 is set to be twice the minimum rotation speed required for the reproduction at the normal speed. For example, if the transfer rate during the normal reproduction is 3.0 Mbps and the rotation speed is the minimum speed required for this transfer rate, the rotation speed is made double during the reproduction at 2-fold speed, so that the transfer rate becomes 6.0 Mbps.

The operation of the video decoder circuit 6 is substantially the same as in the image reproduction at 3-fold speed. The difference from the reproduction at 3-fold speed is how the reproduced video signals are output from the output buffer 68 to the terminal 11. The video data signals from the signal processing circuit 4 through the terminal 61 are processed by inverse quantization and the inverse discrete cosine transform, and then input to the switch 67. The video signals input to the switch 67 include all video signals corresponding to I-picture, P-picture, and B-picture. After the video signals corresponding to B-picture are removed by the control of the switch 67, the video signals are fed to the output buffer 68.

In the image reproduction at 3-fold speed, the video signals corresponding to I-picture and P-picture stored in the output buffer 68 are output to the terminal 11 once per frame. In the image reproduction at 2-fold speed, some frames are output several times, and the other frames are output only once. In the optical disk apparatus of the invention, as is shown in FIG. 5(F), the video signals in the 1st, 7th, 13th, 19th, 25th, and 31st frames and the like are output twice, and the video signals in the other frames are output once. Thus, in the image reproduction at 2-fold speed, the video signal corresponding to I-picture and the video signal corresponding to P-picture which is located in the middle of the P-pictures included in each GOP are output twice, and the video signals corresponding to P-pictures directly preceding and succeeding to I-picture are output once to the terminal 11. These video signals are supplied to the image display portion as the reproduced video signals from the terminal 11.

As described above, in the optical disk apparatus of the invention, video signals in some frames are output several times, as in the image reproduction at 2-fold speed in the conventional apparatus. However, in the optical disk apparatus of the invention, P-picture is used in addition to I-picture, so that the resolution in time sequence can be remarkably enhanced as compared with the conventional apparatus.

The operation of the audio decoder circuit 7 in the image reproduction at 2-fold speed is the same as in the image reproduction at the normal speed and in the image reproduction at 3-fold speed. The pattern of the reproduced audio signals output to the terminal 12 in the reproduction at 2-fold speed is shown in FIG. 5(F). After the audio data signal A1, the audio data signal A3 is input to the buffer 73. Thereafter, the audio data signals are input in the order of A5 and A7. The input audio data signals are demodulated by the DEM 74, and then output from the terminal 12 as the reproduced audio signals. Therefore, in the image reproduction at 2-fold speed, the reproduced audio signals are output from the terminal 12 in a substantially synchronous manner with the reproduced video signals output from the terminal 11 in terms of a unit of two GOPs. In this way, by the optical disk apparatus of the invention, it is possible to reproduce audio which is discrete, but substantially synchronized with the images.

As described above, the optical disk apparatus of the invention can reproduce images at 2-fold speed more smoothly and with audio substantially synchronized with the images, as compared with the conventional apparatus. The audio is reproduced discretely such as A1, A3, A5, and A7, but the contents of audio can be sufficiently understood at such a discrete degree.

The optical disk apparatus of the invention reproduces the audio at the normal speed even in the image reproduction at 2- or 3-fold speed. However, in order to obtain more complete audio information, it is possible to decode all the audio data signals, to compress the decoded audio signals with respect to time. For example, in order to compress the audio signals to be ½ in time, the output clock of the audio is doubled. However, by such a method, the audio pitch (frequency) is increased by one octave. Recently, there has been proposed a method for compressing the audio signals with respect to time without increasing the audio pitch. According to the proposed method, all of the audio signals can be reproduced as shown in FIG. 5(G).

Figure 6:
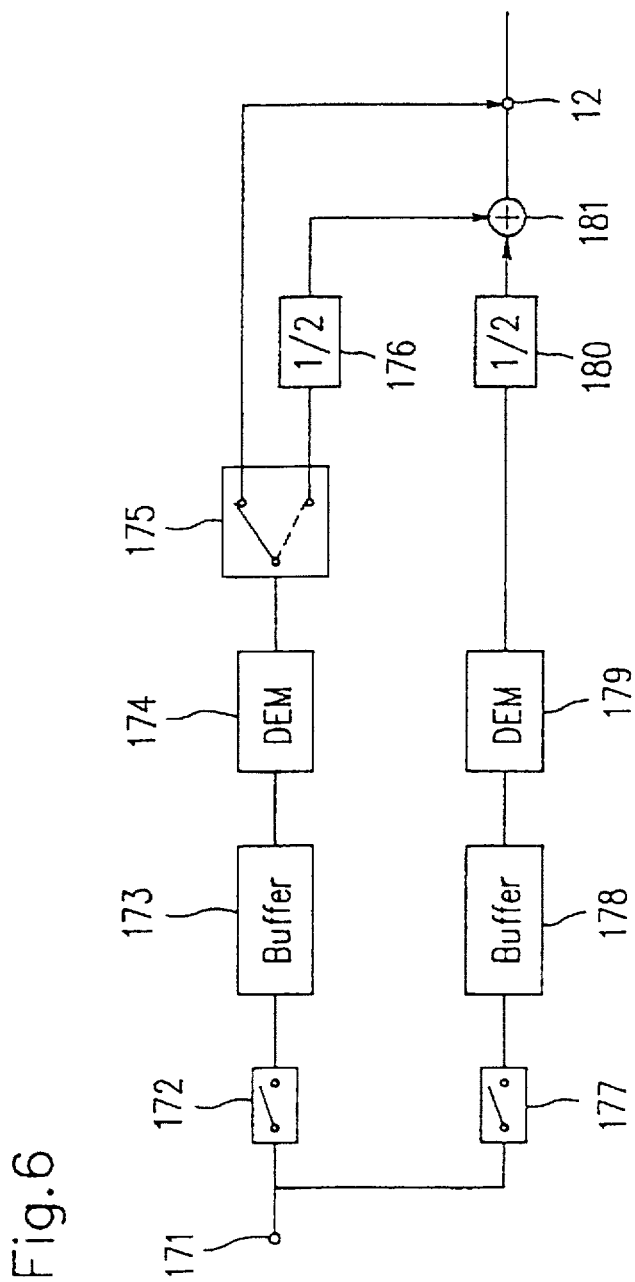
FIG. 6 is a diagram showing another construction of the audio decoder circuit in the optical disk apparatus according to the invention.

FIG. 6 briefly shows the construction of an audio decoder circuit 7 in the case where the audio signals are compressed with respect to time without increasing the audio pitch. The audio data from the signal processing circuit 4 is input through a terminal 171. When the images are reproduced at the normal speed, a switch 172 is closed, a switch 177 is opened. Accordingly, the audio data signals input from the terminal 171 are all input into an input buffer 173, and then into a DEM 174. The audio signals output from the DEM 174 are input to a switch 175. In the normal reproduction, the switch 175 is in the condition indicated by a solid line, so that the audio signals input to the switch 175 are input to the terminal 12. Herein, it is assumed that the switches 172, 175, and 177 are controlled by a controller (not shown).

In the image reproduction at 2-fold speed, the switches 172 and 177 are controlled so that one of the switches is alternately opened. For example, when the first audio data signal A1 is input through the terminal 171, the switch 172 is closed and the switch 177 is opened, so that the audio data signal A1 is input into the input buffer 173 via the switch 172. When the next audio data signal A2 is input, the switch 172 is opened, and the switch 177 is closed, so that the audio data signal A2 is input into an input buffer 178. Thus, odd-numbered audio data signals are input to the input buffer 173 and even-numbered audio data signals are input to the input buffer 178. The audio data signals input to the input buffer 173 are demodulated by the DEM 174, and then output to the switch 175. The switch 175 is in the condition indicated by a broken line during the image reproduction at 2-fold speed. Accordingly, the audio signals from the DEM 174 are decimated to be ½ by an audio compression circuit 176, and then input to a multiplexer 181. The even-numbered audio data signals are fed to an audio compression circuit 180 via the input buffer 178 and the DEM 179. In the audio compression circuit 180, the audio data signals are decimated to be ½, and then input into the multiplexer 181. The multiplexer 181 combines the odd-numbered audio signals and the even numbered audio signals, and then the combined audio signals are output from the terminal 12 as the reproduced audio signals, in the sequence input to the terminal 171.

In this way, the audio signals are compressed to be ½ in time and all of them are reproduced without changing the audio pitch. Instead of the above-described method, by using any known audio compression technique, all the audio data can be reproduced.

In the above example, when the images are reproduced at the normal speed, the optical disk 1 is rotated at the minimum rotation speed required for realizing the transfer rate in the normal reproduction. Alternatively, the optical disk 1 may be rotated at any rotation speed higher than the minimum rotation speed. In such a case, when the amount of data fed from the reproduction head 2 to the reproduced signal processing portion 3 and accumulated in the buffer reaches a predetermined amount, a so-called intermittent reproduction is performed, that is, the reproduction becomes into the waiting state in which the picture is still. If the rotation speed of the optical disk 1 in the image reproduction at the normal speed is set to the minimum rotation speed that is necessary to realize the transfer rate required for the image reproduction at 2-fold speed, it is unnecessary to increase the rotation speed of the optical disk 1 for the purpose of image reproduction at 2-fold speed. In addition, if, in the image reproduction at the normal speed, the optical disk 1 is rotated at the minimum rotation speed required for the image reproduction at 3-fold speed, it is unnecessary to increase the rotation speed for the purpose of image reproduction 2- or 3-fold speed. In such a case, the above-described intermittent reproduction is performed during the image reproduction at 2-fold speed.

The degree of increase in rotation speed, i.e., increase in transfer rate is not limited to double or three times as described in the above example. If the transfer rate is increased about ten times, the same effects as described in the above example can be attained. In this case, the frequency of the clock used for the reproduced signals should be increased in accordance with the increase in transfer rate. Moreover, if the optical disk 1 is rotated at the rotation speed at which a transfer rate higher than the transfer rate in the image reproduction at 2- or 3-fold speed can be realized, it is unnecessary to increase the rotation speed for the purpose of the high-speed reproduction.

In the above example, the image in one and the same frame is displayed once or twice. The display frequency of the image in one and the same frame is not limited to the specific times as described above. For example, the display frequency may be switched among one to three times in accordance with the reproduction speed.

In the above example, the video data which is intra-frame or inter-frame coded is reproduced. It is appreciated that the present invention can be applied to the case where the video data which is intra-field or inter-field coded is reproduced.

In the above example, the states of the switches in the video decoder circuit and the audio decoder circuit are controlled by controllers. Alternatively, the states of the switches may be controlled by any other methods. If the switches are controlled to be closed for I-picture and P-picture and to be opened for B-picture, the same effects as in the above example can be attained.

In the above example, the audio data is reproduced in a unit of one GOP. The unit for the reproduction of audio data is not limited to one GOP. For example, a unit of one second or a unit of several seconds may be used. In such a case, it is not necessary that the audio is completely synchronized with the images. As described above, it is preferred that the audio and the image are synchronized with each other in terms of a unit of several GOPs or a unit of several seconds.

According to the invention, in the high-speed reproduction, the transfer rate is increased to be higher than the normal transfer rate. Accordingly, after all the data is read out from the optical disk, the video data signals corresponding to B-picture can be removed. As a result, it is possible to reproduce only I-picture and P-picture, so that the resolution in time sequence can be significantly enhanced as compared with the conventional apparatus which reproduces only I-picture. Therefore, it becomes possible to reproduce more smoothly continuous images at a high speed, as compared with the conventional apparatus.

Furthermore, according to the invention, although the audio is discrete, the audio can be reproduced in a substantially synchronous manner with the images, so that the high-speed image reproduction with audio can be realized.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical disk apparatus comprising:

signal processing means for reading video data and audio data from an optical disk and for generating a video data signal and an audio data signal in accordance with the read-out video data and audio data;

video decoder means for receiving the video data signal from the signal processing means and for decoding the received video data signal to generate a reproduced video signal;

control means for generating a high-speed reproduction control signal for switching from a normal reproduction to a high-speed reproduction; and audio decoder means for generating a reproduced audio signal based on the audio data signal from the signal processing means, wherein when the high-speed reproduction control signal is received from the control means, the audio decoder means demodulates only part of the audio data signal generated in a first period, and does not demodulate part of the audio data signal generated in a second period succeeding the first period, so as to output only the demodulated part generated in the first period as the reproduced audio signal, and in the normal reproduction, the audio decoder means decodes all of the audio data signal, so as to output the decoded audio data signal as the reproduced audio signal, the first period and the second period being alternately repeated, wherein the video decoder means includes means for, when the high-speed reproduction control signal is received from the control means, outputting video signals decoded from only the intra-coded video data and forward predictive coded video data among the intra-coded video data, forward predictive coded video data and bidirectionally predictive-coded video data contained in the received video data signal as the reproduced video signal.

2. An optical disk apparatus according to claim 1, wherein the first period corresponds to n groups of pictures, and the second period corresponds to m groups of pictures, n and m being integers equal to or greater than 1.

3. An optical disk apparatus comprising:

signal processing means for reading video data and audio data from an optical disk and for generating a video data signal and an audio data signal in accordance with the read-out video data and audio data;

video decoder means for receiving the video data signal from the signal processing means and for decoding the received video data signal to generate a reproduced video signal;

control means for generating a high-speed reproduction control signal for switching from a normal reproduction to a high-speed reproduction; and audio decoder means for receiving the audio data signal from the signal processing means and for generating a reproduced audio signal so as to be substantially synchronized with the corresponding reproduced video signal based on the received audio data signal, wherein the audio decoder means includes: means for demodulating the audio data signal; and means for, when the high-speed reproduction control signal is received from the control means, compressing the demodulated audio data signal with respect to time and outputting the compressed audio data signal as the reproduced audio signal, and for, in the normal reproduction, outputting the demodulated audio data signal as the reproduced audio signal without compression, wherein the video decoder means includes: video data decoding means for decoding the video data signal; and means for, when the high-speed reproduction control signal is received from the control means, outputting video signals decoded from only the intra-coded video data and forward predictive coded video data among the intra-coded video data, forward predictive coded video data and bidirectionally predictive-coded video data contained in the received video data signal as the reproduced video signal.

4. An optical disk apparatus according to claim 3, wherein the audio decoder means generates the reproduced audio signal so as to be synchronized with signals corresponding to the intra-coded video data among the reproduced video signals.

* * * * *